United States Patent
Godon et al.

(10) Patent No.: US 9,669,570 B2
(45) Date of Patent: Jun. 6, 2017

(54) PROCESS FOR INJECTION MOULDING A COMPOSITE PART

(75) Inventors: Thierry Godon, Sevran (FR); Bruno Jacques Gérard Dambrine, Le Chatelet en Brie (FR); Eduardo Antonio Julian Ruiz, Montreal (CA); François Trochu, Montreal (CA)

(73) Assignee: SNECMA, Paris (FR)

( * ) Notice: Subject to any disclaimer, the term of this patent is extended or adjusted under 35 U.S.C. 154(b) by 141 days.

(21) Appl. No.: 14/116,068

(22) PCT Filed: May 2, 2012

(86) PCT No.: PCT/FR2012/050973
§ 371 (c)(1),
(2), (4) Date: Jan. 9, 2014

(87) PCT Pub. No.: WO2012/153035
PCT Pub. Date: Nov. 15, 2012

(65) Prior Publication Data
US 2014/0124987 A1    May 8, 2014

(30) Foreign Application Priority Data
May 6, 2011 (FR) ...................... 11 53929

(51) Int. Cl.
*B29C 45/00* (2006.01)
*B29C 70/48* (2006.01)

(52) U.S. Cl.
CPC .......... *B29C 45/0025* (2013.01); *B29C 70/48* (2013.01)

(58) Field of Classification Search
None
See application file for complete search history.

(56) References Cited

U.S. PATENT DOCUMENTS

| | | | | |
|---|---|---|---|---|
| 3,137,750 A * | 6/1964 | Gringras | ........................ | 264/257 |
| 3,975,479 A * | 8/1976 | McClean | ........................ | 264/102 |
| 4,460,531 A * | 7/1984 | Harris | .................... | B29C 70/347 |
| | | | | 156/173 |
| 5,540,877 A * | 7/1996 | Repetto et al. | ................ | 264/513 |
| 2011/0318513 A1 | 12/2011 | Marsal et al. | | |

FOREIGN PATENT DOCUMENTS

| | | |
|---|---|---|
| DE | 10 2009 039 116 | 4/2011 |
| FR | 2 940 173 | 6/2010 |
| FR | 2 950 286 | 3/2011 |
| WO | 2011 027074 | 3/2011 |

OTHER PUBLICATIONS

International Search Report Issued Jul. 16, 2012 in PCT/FR12/050973 Filed May 2, 2012.

* cited by examiner

*Primary Examiner* — Monica Huson
(74) *Attorney, Agent, or Firm* — Oblon, McClelland, Maier & Neustadt, L.L.P.

(57) ABSTRACT

A method of injection molding a part made of composite material is provided. The method includes placing a preform in a mold; injecting a resin into the mold so as to impregnate the preform; unmolding the part after curing the resin; and subjecting the resin and the preform to pressure inside the mold while the resin is curing.

10 Claims, 2 Drawing Sheets

PROCESS FOR INJECTION MOULDING A COMPOSITE PART

BACKGROUND OF THE INVENTION

Field of the Invention

The present invention relates to a method of injection molding a composite material part, in particular in the field of aviation.

Description of the Related Art

Such a method generally consists in placing a preform in a mold, the preform being made by three dimensionally weaving yarns, for example, in injecting a resin into the mold so as to impregnate the preform, and then in unmolding the part after the resin has cured. Such a method is known as resin transfer molding (RTM).

Patent application FR2950286, in the name of the applicant, discloses a method of the RTM type for fabricating a composite material blade, the method consisting in:

making a preform by three dimensionally weaving yarns, the preform comprising a root portion and an airfoil portion that are connected together by sloping side faces that are to form bearing surfaces for the root in an assembly slot in a rotor disk;

compacting the preform in a mold having a recess that includes first sloping side faces corresponding to the above-mentioned side faces of the preform, and second sloping faces that bear against the root portion of the preform, and that slope in the opposite direction to the first sloping side faces; and injecting a resin under a vacuum into the mold and polymerizing the resin.

The fiber preform is thus embedded in a rigid resin matrix, the fibers of the preform having a mechanical reinforcement function, and the resin matrix serving to hold the part together.

Depending on the injection parameters and on the type of resin used, pores may appear in the injected part, in the core of the part, and/or in its surface. These pores weaken the part considerably, and the part must then be scrapped.

Studies have shown that these pores stem from a chemical compound that is generated during curing of the resin, which compound is present in gaseous form under the temperature and pressure conditions inside the mold.

The gas creates bubbles that are held captive in the preform and in the resin, and on hardening during curing, they produce pores.

BRIEF SUMMARY OF THE INVENTION

A particular object of the invention is to provide a solution to this problem that is simple, effective, and inexpensive.

To this end, the invention provides a method of injection molding a part made of composite material, the method consisting in placing a preform in a mold, in injecting a resin into the mold so as to impregnate the preform, and in unmolding the part after curing the resin, the method being characterized in that it also consists in subjecting the resin and the preform to pressure inside the mold while the resin is curing.

Applying pressure inside the mold during curing serves to avoid bubbles of gas appearing in the resin, thereby avoiding the injected part including any pores.

According to a characteristic of the invention, the pressure is applied to the part in the mold before the degree of curing of the resin exceeds a value, referred to as a critical value, lying in the range 20% to 30%.

The pressure is thus advantageously applied to the part before bubbles of gas have been given off inside the part. In addition, the resin is still sufficiently fluid at this time for the entire inside volume of the mold to be subjected uniformly to a pressure that is high enough to prevent bubbles forming.

Advantageously, the pressure applied to the part in the mold is higher than the vapor pressure of a gas generated during curing of the resin.

This makes it possible to guarantee that no bubbles of gas are formed during the curing of the resin.

By way of example, the pressure applied to the part is greater than or equal to 2 bars, in relative value, i.e. relative to atmospheric pressure.

By way of example, the resin may be an epoxy resin, a bismaleimide resin, a polyimide resin, or any resin including volatile impurities and/or solvents.

In an embodiment of the invention, the pressure is applied to the part by injecting a fluid under pressure into the mold, e.g. by injecting a gas such as air or nitrogen, or a liquid that is not miscible with the resin.

Preferably, the fluid under pressure is injected into the mold via a plurality of distinct points, thereby making it possible to ensure that the pressure is sufficiently uniform inside of the mold. Multipoint injection also makes it possible to reduce injection time.

When the volume of the part is large and a large amount of material is required, the time needed for injecting the resin is increased. Once the resin has been completely injected, its curing may already be too far advanced, which means that the resin is already too viscous or rigid to enable pressure to be distributed uniformly, and thus to prevent pores from forming.

Under such circumstances, it is thus preferable to proceed with multipoint injection, so as to shorten injection time. The resin injection circuit may be different from or identical to the circuit for applying pressure.

It is important for all points within the part to be subjected to the pressure necessary for preventing bubbles of gas from forming.

In another embodiment of the invention, the preform and the resin are compressed in the mold by at least one actuator.

In a variant, an element suitable for expanding is inserted in the mold, the mold being subjected to a temperature rise during injection molding of the part such that the above-mentioned element subjects the resin and the preform to pressure while the resin is curing.

By way of example, this element may be a spacer of silicone, of copper, or of aluminum.

Advantageously, the mold is evacuated for injecting the resin, thereby enabling injection time to be shortened and improving the quality of the finished part.

BRIEF DESCRIPTION OF THE SEVERAL VIEWS OF THE DRAWINGS

The invention can be better understood and other details, characteristics, and advantages invention appear on reading the following description made by way of nonlimiting example and with reference to the accompanying drawings, in which.

DETAILED DESCRIPTION OF THE INVENTION

A first implementation of a method of injection molding a turbine engine blade made of composite material is described below with reference to FIG. 1.

The method consists initially in placing a blade preform in a mold. The preform may be made by weaving yarns in two or three dimensions.

Figure 1:
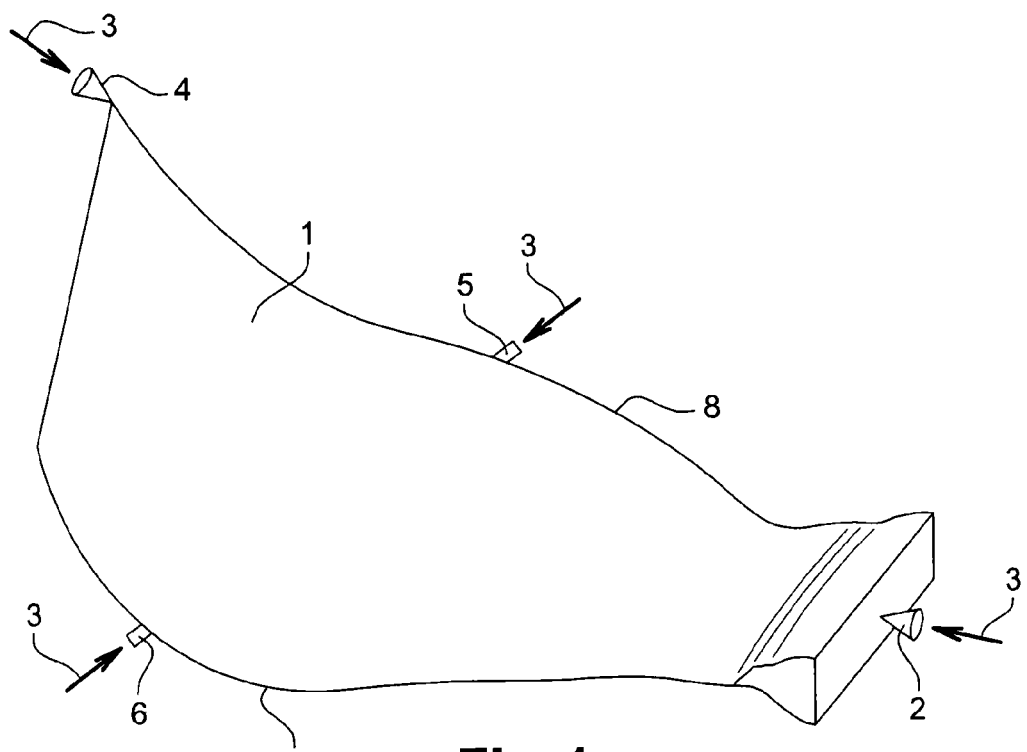
FIG. 1 is a perspective view of a turbine engine blade made of composite material and having marked thereon points for injecting material and fluid under pressure.

Resin is then injected into the mold via at least one point 2 shown diagrammatically in FIG. 1, in such a manner as to impregnate the preform, with the mold preferably being evacuated while this injection is taking place. Such a method is known as vacuum assisted resin transfer molding (VARTM). By way of example, the resin used is an epoxy resin, e.g. the type known under the reference PR520N, a bismaleimide resin, a polyimide resin, or any resin including solvents and/or volatile impurities.

By way of example, the pressure of the resin during injection is of the order of 1 bar to 2 bars, and the temperature is of the order of 150° C. to 200° C. The duration of injection is of the order of a few minutes, for example 30 min at most.

While the resin is curing inside the mold, a chemical compound in gaseous form may form inside the resin, or it may already be present therein.

In order to avoid bubbles of gas forming in the part, once the mold has been filled with a resin, a gas under pressure is injected into the mold via one or more distinct points, represented diagrammatically in FIG. 1 by arrows 3. The gas is preferably injected at a pressure higher than atmospheric pressure. By way of example, the gas under pressure is air or nitrogen at a pressure lying in the range 3 bars to 5 bars. The fluid under pressure may also be a liquid that is not miscible with the resin, for example oil.

This injection of fluid under pressure is preferably performed as soon as possible after injecting the resin so as to ensure that the pressure is applied to the part inside the mold before the degree of curing of the resin exceeds a so-called "critical" value, lying in the range 20% to 30%. This critical value may vary as a function of the nature of the resin and of the fibers.

Below this threshold, the resin is sufficiently fluid to ensure that the resin and the preform are subjected uniformly to the pressure, thereby guaranteeing that there are no pores at any point inside the part.

The temperature and the gas pressure are maintained until the resin has cured completely so as to make a composite blade that has no pores and that comprises a fiber preform embedded in a rigid resin matrix. The part can then be un-molded.

The injection mold (not visible in FIG. 1) conventionally includes at least one resin injection hole 2 and one vent hole 4. These holes 2, 4 may be used for injecting gas under pressure. Other points 5, 6 for injecting gas under pressure may also be provided, e.g. in the leading edge 7 and in the trailing edge 8 of the blade 1.

It is also possible for all of the gas injection points 3 to be separate from the resin injection point 2 and the vent hole 4. In this way, it is possible to begin by injecting the resin in one workstation, and then continue by injecting the gas under pressure in another workstation, so as to avoid occupying the resin injection workstation in a fabrication line for too long a time. This also avoids the points 3 for injecting gas under pressure being obstructed by plugs resulting from the resin gelling at an injection point 2.

The method may also include a plurality of successive stages of injecting resin into the mold and of pressurizing the resin and the mold, in particular when molding parts that are voluminous.

Figure 2:
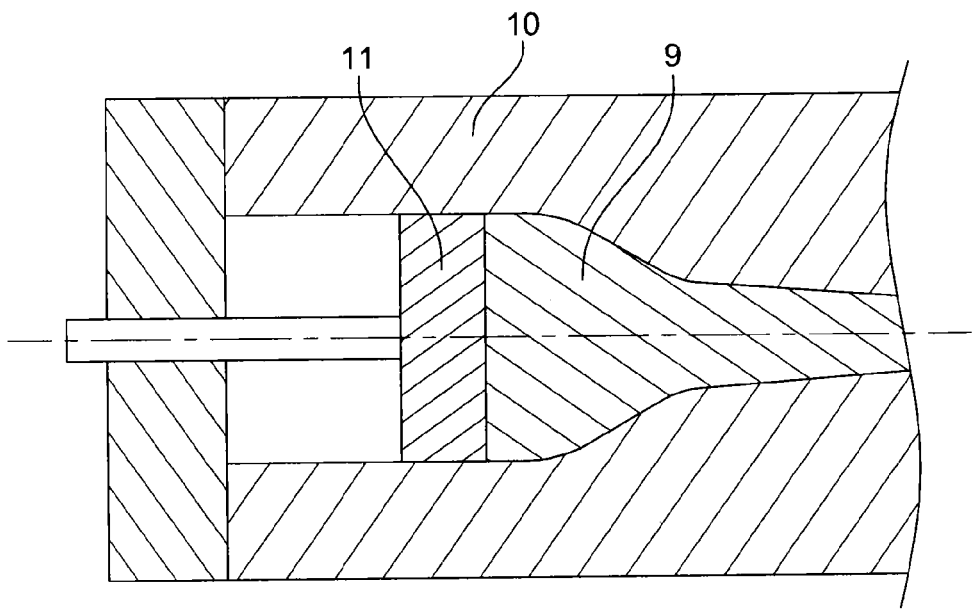
FIG. 2 is a fragmentary section view relating to a variant embodiment of the invention in which the pre-form and the resin are compressed in a mold by means of an actuator.

FIG. 2 shows a variant of the invention in which the method of molding the blade consists in placing a preform 9 in a mold 10, in injecting the resin into the mold so as to impregnate the preform 9, in compressing the preform and the resin in the mold by means of an actuator 11, and in unmolding the blade after the resin has cured.

Figure 3:
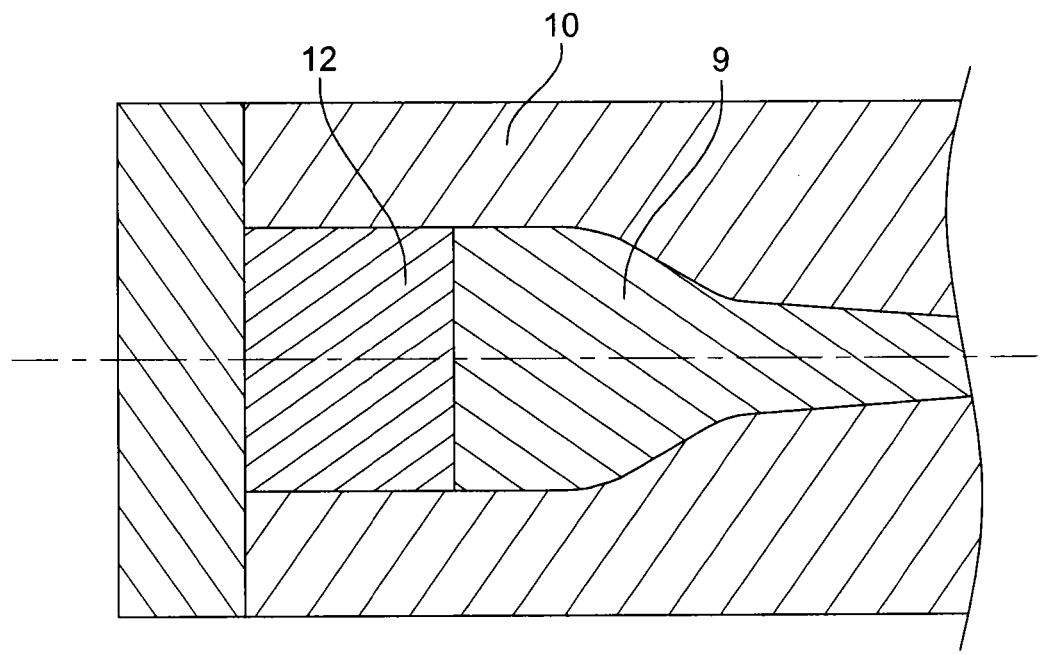
FIG. 3 is a fragmentary section view relating to another variant embodiment of the invention, in which the preform and the resin are compressed in the mold by an element that is suitable for expanding during molding.

FIG. 3 shows another variant embodiment in which an element 12 suitable for expanding is placed together with the preform 9 in the mold 10. After injecting resin into the mold 10, the resin, the preform, and the element are heated so that the element 12 expands and exerts pressure on the resin and on the preform 9. The part is unmolded after the resin has cured.

By way of example, the element 12 is a spacer made of silicone, of copper, or of aluminum.

In FIGS. 2 and 3, the principle is similar to that described with reference to FIG. 1, in that the resin and the preform are subjected to sufficient pressure to avoid bubbles of gas forming while the resin is curing.

The invention claimed is:

1. A method of injection molding a blade comprising a composite material, the method comprising:
    placing a blade fiber preform in a mold, the blade fiber preform being formed by weaving yarns and including a root portion having a first planar sloping face, a second planar sloping face, and a bottom planar face between the first and second sloping faces in a cross-sectional view, and an airfoil portion having a leading edge and a trailing edge;
    injecting a resin into the mold so as to impregnate the blade fiber preform;
    unmolding the blade after curing the resin; and
    subjecting the resin and the blade fiber preform to pressure inside the mold while the resin is curing,
    wherein the blade is free of pores,
    wherein the mold includes a resin injection hole facing the bottom planar face of the root portion and a vent hole facing a tip of the airfoil portion, a first gas injection hole facing the leading edge of the airfoil portion, and a second gas injection hole facing the trailing edge of the airfoil portion, and
    wherein the pressure is applied to the blade fiber preform by injecting a fluid under pressure into the mold via the first gas injection hole and the second injection hole.

2. The method according to claim 1, wherein the pressure is applied to the blade fiber preform in the mold before a degree of curing of the resin exceeds a value of from 20% to 30%.

3. The method according to claim 1, wherein the pressure applied to the blade fiber preform in the mold is higher than a vapor pressure of a gas generated during curing of the resin.

4. The method according to claim 1, wherein the pressure applied to the blade fiber preform is greater than or equal to 2 bars, relative to atmospheric pressure.

5. The method according to claim 1, wherein the resin is an epoxy resin, a bismaleimide resin, a polyimide resin, or any resin comprising volatile impurities, solvents, or both.

6. The method according claim 1, wherein the mold is evacuated in order to inject the resin.

7. The method according to claim 1, further comprising a plurality of successive stages of injecting resin into the mold and of pressurizing the resin and the mold.

8. The method according to claim 1, wherein the fluid injected under pressure is a gas such as air or nitrogen, or a liquid that is not miscible with the resin.

9. The method according to claim 1, wherein the mold includes recesses corresponding to the first and second sloping faces of the root portion.

10. The method according to claim 1, wherein the pressure is further applied to the blade fiber preform by injecting the fluid under pressure into the mold via the resin injection hole and the vent hole.

* * * * *